United States Patent [19]
Kennedy et al.

[11] Patent Number: 5,491,645
[45] Date of Patent: Feb. 13, 1996

[54] METHOD AND SYSTEM FOR N-TRACK CORRELATION

[75] Inventors: Eugene T. Kennedy; Neils H. Hansen, both of Longmont, Colo.

[73] Assignee: International Business Machines Corporation, Armonk, N.Y.

[21] Appl. No.: 136,177

[22] Filed: Oct. 13, 1993

[51] Int. Cl.$^6$ ............................................ G01S 13/72
[52] U.S. Cl. ............................ 364/516; 342/357; 342/95
[58] Field of Search ............................ 364/516, 443, 364/447, 456; 235/411; 342/76, 95, 357

[56] References Cited

U.S. PATENT DOCUMENTS

| | | | |
|---|---|---|---|
| 4,855,932 | 8/1989 | Cangiani et al. | 364/516 |
| 4,958,224 | 9/1990 | Lepore et al. | 358/126 |
| 4,987,420 | 1/1991 | Inamiya | 342/457 |
| 5,105,198 | 4/1992 | Inamiya | 342/457 |
| 5,126,748 | 6/1992 | Ames et al. | 342/353 |
| 5,148,179 | 9/1992 | Allison | 342/357 |
| 5,160,935 | 11/1992 | Inamiya | 342/357 |
| 5,325,098 | 6/1994 | Blair et al. | 342/95 |
| 5,351,056 | 9/1994 | Sawyer | 342/195 |
| 5,355,325 | 10/1994 | Uhlmann | 364/516 |
| 5,365,451 | 11/1994 | Wang et al. | 364/449 |
| 5,392,225 | 2/1995 | Ward | 364/516 |
| 5,400,264 | 3/1995 | Phillis et al. | 364/516 |
| 5,414,643 | 5/1995 | Blackman et al. | 364/516 |

OTHER PUBLICATIONS

Lecture Notes–Kalman Filtering, Engineering 881.38, vol. 1, University of California.
Technical Paper–Factorization Methods for Discrete Sequential Estimation, Gerald J. Bierman, California Institute of Technology.

*Primary Examiner*—Ellis B. Ramirez
*Assistant Examiner*—Patrick J. Assovad
*Attorney, Agent, or Firm*—David A. Mims, Jr.; Edward H. Duffield

[57] ABSTRACT

A computer system and method for accurately transforming multiple returns received by multiple satellites from multiple targets into a set of single accurate tracks for each target. Observations from multiple satellites create partial or resulting tracks. These resulting tracks are then correlated with pre-existing base tracks by a series of steps in which resulting tracks are paired with pre-determined base tracks according to a series of criteria. Pairs based on: common observation points and time spans, common satellites, and lack of common satellite, are considered sequentially. The final attempt at correlation consists of pairing each remaining track with each base track and using profile dependent piece correlation of the pairs. Any remaining resulting tracks are then added to the set of base tracks.

8 Claims, 7 Drawing Sheets

Step

310 Establish Base Tracks $B_i$.

320 Receive New Observations $O_{ij}$ and create resulting tracks $R_i$.

330 Create two lists: $\{R_i\}$ and $\{B_i\}$

340 Create pairs $R_j$, $B_k$ where the resulting track and base track have at least one observation in common.

341 Correlate those pairs with:
    1. three or more shared returns, and
    2. four or more scans in common 342 Correlate those pairs with:
    1. two shared returns, and
    2. only three scans in common 343 Create new "pool" of remaining resulting tracks.

350 Of remaining set $\{R_j\}$, create pairs $(R_j, B_k)$ where the resulting track and base track have at least one satellite in common.

351 Discard the track pairs where the time gap is too large.

352 Select three returns from $R_j$ and three from $B_k$ of remaining pairs. Calculate goodness-of-fit using procedure defined in Table 1.

353 Create new "pool" of the remaining resulting tracks.

360 Of remaining set $\{R_j\}$, create pairs $(R_j, B_k)$ where the resulting track and base track have no satellite in common.

*Fig. 3A*

Step

361 For R$_j$ select the satellite SR which received the most returns associated with R$_j$, create a subset Q1 of the returns associated with R$_j$ which come from SR.

For B$_j$ select the satellite SB which received the most returns associated with R$_j$, create a subset Q2 of the returns associated with B$_j$ which come from SB.

Select three returns from Q1 and three returns from Q2 such that the collection of returns covers the minimum time period. Denote the six returns as O$_i$ {i = 1, . . . 6}.

362 Discard any pair of tracks where the time span associated with the set of returns O$_i$' {i = 1, . . . 6} is greater than a specified value V4.

363 For each return O$_i$ calculate the coplanarity residual, $\sin\theta$.

364 Using $\theta$, calculate an estimate of the three dimensional position vector $\vec{P}^{ecf}$ of the six returns O$_i$.

365 Using $\vec{P}^{ecf}$, obtain an estimate of the velocity of track.

366 Using $\vec{P}^{ecf}$ and velocity, obtain a goodness of fit.

367 Correlate those tracks with acceptable GATT scores. In the case of tie scores, select the track with smallest coplanarity residual.

368 Create new "pool" of the remaining resulting tracks.

370 Attempt to correlate each remaining track in pool with a base track by using a profile dependent piece correlation.

380 Add any non-correlated resulting tracks to the set of base tracks.

*Fig. 3B*

METHOD AND SYSTEM FOR N-TRACK CORRELATION

FIELD OF THE INVENTION

The present invention is broadly related to data processing systems and methods and, more particularly, is related to an improved method of object position determination using returns from multiple satellites.

BACKGROUND OF THE INVENTION

Target tracking is the process of calculating the path or track of a moving object by monitoring its current position and using the data obtained from this monitoring to project the targets future position. Monitoring the position of an object may be performed either actively or passively. Active monitoring requires sending out a signal from a station and receiving reflections (or hits) of those signals from an on-coming target. Passive monitoring requires that a station receive a signal (return) sent out by the target. Either method can make use of multiple stations in order that the position be more accurately determined by triangulation methods. A common example of target tracking is the process of air traffic control: radar stations send out signals and receive reflections from on-coming planes (targets), thereby determining the flight path (track) of the plane.

In many applications, multiple targets must be tracked. The more common situation is that multiple targets are moving in relatively close proximity to the other and the path of each must be distinguished and determined. Where multiple observations of multiple targets are being received from multiple stations, correctly calculating the track of each target requires that each observation be correctly associated with a specific target. Where the target paths are closely spaced, matching observations to targets presents a significant problem. This is clearly illustrated in FIG. 1A. FIG. 1A, a projection on a plane extending roughly perpendicular to the surface of the earth, shows three previously calculated tracks, $B_1$, $B_2$, and $B_3$, for targets $T_1$, $T_2$, and $T_3$ (not shown), respectively. New returns from the observation stations, satellites S1 and S2 are indicated by points $O_i$. Six partial tracks calculated from these returns are shown as $R_1$ through $R_6$. As can be seen, the partial track $R_2$ could be associated with either $B_1$ or $B_2$. If the partial track was incorrectly determined to correlate (i.e. was incorrectly associated) with $B_2$, then the track that is projected from the collection of observation points in $B_2$ and $R_2$ could diverge from the actual path of the target. In the worst case, the calculated track could terminate.

FIG. 1A also illustrates another problem. When returns are received from multiple stations (or multiple pairs of stations), it is common in the art to take all combinations of returns and attempt to create small track pieces such as $R_5$ and $R_6$. As can be seen in the figure, return $O_{56}$ was used to calculate both $R_5$ and $R_6$. In reality, of course, $O_{56}$ could only have come from one target and should only be used once in combination with one of the three previously calculated tracks. Accordingly, if $R_5$ is correlated with $B_2$, the conclusion is that $O_{56}$ came from $T_2$ and should not be used in any calculations that involve projected tracks for either of the other targets. Further, in the case illustrated, $R_6$ should not be correlated with any of the tracks, since one of its observations was already used in the correlation of $R_5$ and $B_2$. This type of problem is generally referred to as "duplicate returns."

It should be noted that FIG. 1A, and in fact, none of the figures, are drawn to scale. In reality, the area scanned by the satellites is orders of magnitude greater than the length of the partial tracks.

OBJECTS OF THE INVENTION

It is therefore an object of the invention to provide an improved method and system of target tracking.

It is a further object of the invention to successfully track multiple targets in three dimensional space where returns are received from multiple sensors.

It is a further object of the invention to provide a method by which returns from multiple stations may be successfully correlated with preexisting tracks and the results accurately predict the paths of multiple targets.

SUMMARY OF THE INVENTION

The invention disclosed herein is a computer system and method for accurately transforming multiple returns received by multiple satellites from multiple targets into a set of single accurate tracks for each target. More specifically, the invention uses observations from multiple satellites to create partial or resulting tracks. These resulting tracks are then correlated with pre-existing base tracks.

The invention provides a means to eliminate duplicate reporting and correctly correlate the tracks calculated from different views of the same event to form one, final correct track. The invention further improves the computational aspects of track correlation so that the correlated results yield projections of track correctly positioned in three dimensional space.

The preferred embodiment of the invention is for N-satellite processing. That is, the current embodiment is used to project tracks where the returns are received from two or more satellites. (The term stereo processing is used if returns are received from only two satellites; monocular refers to returns from a single satellite.) Accordingly, the current embodiment may be employed in tracking a plurality of targets in a system including a plurality of satellite observation stations in stable geocentric orbit.

The invention is employed in a target tracking system which includes a plurality of satellites in stable, geocentric orbit about the earth. The satellites are operatively connected to a data processing system which receives information from the satellites, performs the required processing, performs the specified correlations, and displays the results.

The method begins by establishing a set of base tracks for the tracked targets, these base tracks having been established by any means, including a pair iteration of the method of the invention. From new returns from the multiple satellites, new partial or resulting tracks are projected. The purpose the invention is to select the correct member of the set $\{R_i\}$ of resulting tracks to associate with a specific member of the set $\{B_i\}$ of base tracks, the selected resulting track is then correlated with the base track to which it was matched.

The selection process occurs in a series of steps. Each step starts by creating pairs of resulting tracks and base tracks, where the resulting tracks are selected from the pool of resulting tracks based on a specific criteria. Each step ends by eliminating from the pool all tracks which were successfully associated with a base track and all observations that belong to those tracks from the remaining tracks. This process creates a new pool for the next step to use.

The first criteria used selects those resulting tracks which share a return in common with a base track to be paired with that base track. If a resulting track shares three or more returns with a base track and if there are at least four time period of the satellites observation (scans) in which both the resulting track and the base track have observations (i.e. the resulting track and base track have four or more scans in common), then the resulting track and the base track are correlated. Further, if the resulting track and the base track share two returns and the time overlap is two or three scans, the resulting track and base track will be correlated.

The next criteria used selects those resulting tracks based on returns from a common satellite with a base track to be paired with that base track. Of the pairs of resulting tracks and base tracks formed by this requirement, some are eliminated because of a too large time gap between the resulting track returns and the base track returns. Of the remaining pairs, a goodness-of-fit score is calculated and for each resulting track, the base track with which it has the lowest goodness of fit score is chosen for correlation.

The next criteria pairs resulting tracks with those base tracks which do not share a common satellite. Coplanarity residuals are calculated for three observations from each track, as are estimates of three dimensional position and target velocity. A goodness-of-fit score is then calculated and pairs with appropriate scores are correlated.

The next step of the invention consists of pairing each remaining track with each base track and using profile dependent piece correlation of the pairs.

The final step is comprised of taking all those resulting tracks which have not been correlated with a base track and adding them (the resulting tracks) to the set of base tracks.

BRIEF DESCRIPTION OF THE FIGURES

FIG. 3 is a process diagram of the step of the invention.

DETAILED DESCRIPTION OF THE PREFERRED EMBODIMENT

The preferred embodiment of the invention is for N-satellite processing. That is, the current embodiment is used to project tracks where the returns are received from two or more satellites. (The term stereo processing is used if returns are received from only two satellites; monocular refers to returns from a single satellite.) Accordingly, the current embodiment may be employed in tracking a plurality of targets in a system including a plurality of satellite observation stations in stable geocentric orbit.

Figure 1A:
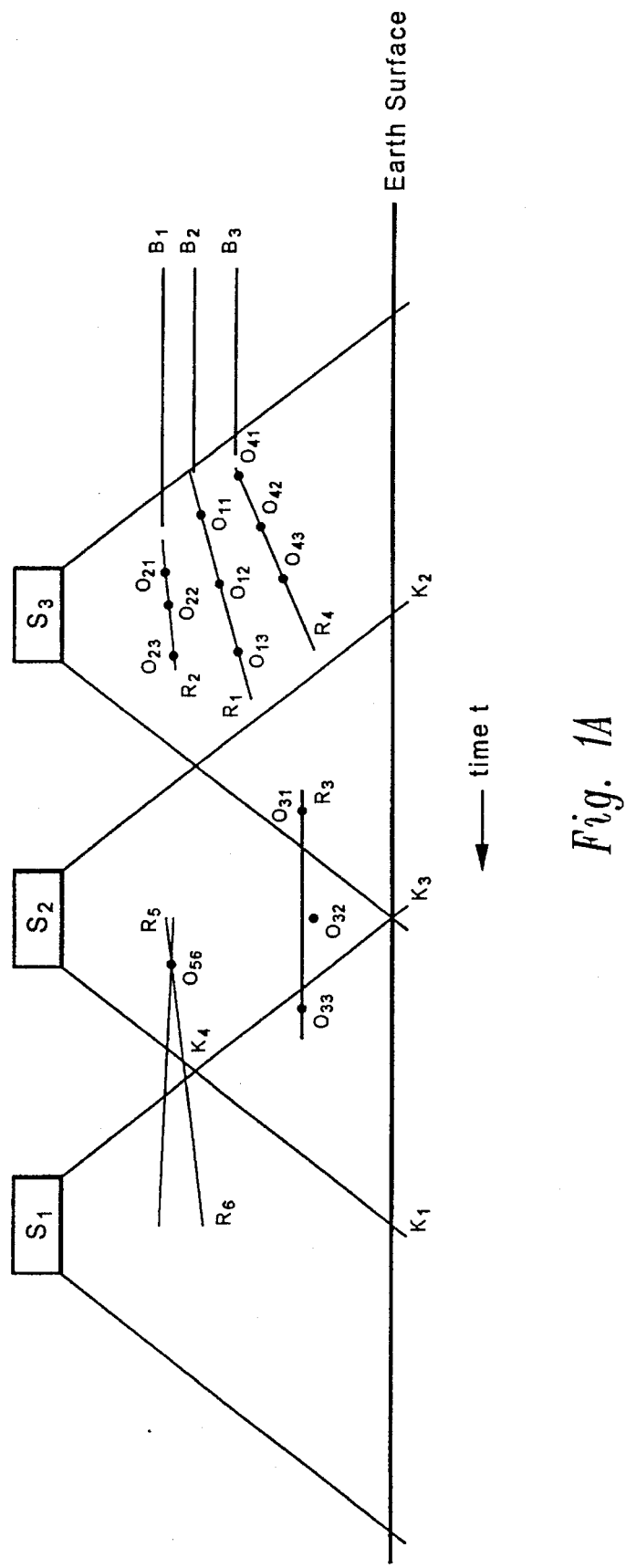
FIG. 1A is a representation of the tracking satellites, base tracks, and resulting tracks from a view taken in a plane perpendicular to the surface of the earth.

FIG. 1A is a schematic diagram of environment in which the current embodiment is employed. FIG. 1A is a view taken on a plane which is "perpendicular" to the surface of the earth. More precisely, the view is a projection of a three-dimensional area above the surface of the earth on a plane extending through the center of the earth and a satellite in geocentric orbit above the earths surface.

In FIG. 1A three satellite stations (S1, S2 and S3) are shown in stable geocentric orbit. In the current embodiment, these satellites are capable of receiving infrared signals (returns) from targets as those targets pass through a specific three dimensional segment of space, (for example, satellite S2 can receive data from any target in the range of space represented in the two dimensional projection in FIG. 1A as the area lying between $K_1$, $K_2$, and $S_2$. Each satellite receiver sweeps over its assigned area: successive sweeps over the same area are known as scans. Thus, at any given moment, the satellite is actually receiving data from only a small portion of its specified segment. It will be noted that more than one satellite can sweep a given area. For example, $S_1$ and $S_2$ both cover the three dimensional segments represented by the two dimensional area $K_1.K_2.K_4$.

Figure 2:
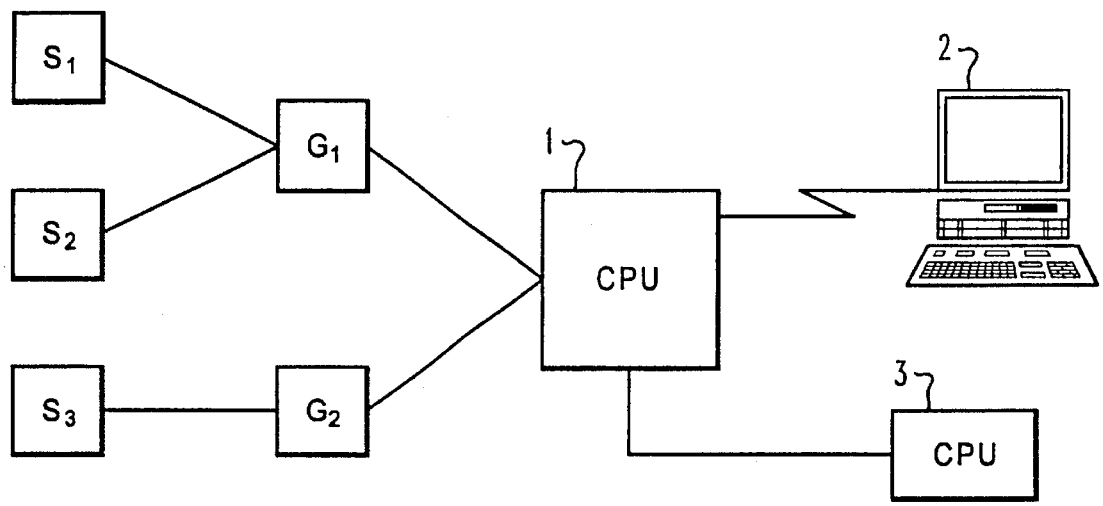
FIG. 2 is a schematic diagram of the operational environment of the invention.

Referring to FIG. 2, it can be seen the satellites $S_1$, $S_2$, and $S_3$ are operatively connected to ground receiving stations $G_1$ and $G_2$ which in turn are connected to a data processing system comprised of a central processing unit or CPU1 which receives observations from satellites $S_1$, $S_2$ and $S_3$ and executes computer programs embodying the flow diagrams an tables described below. The results of the calculations may be displayed on display 2 or alternatively, transmitted to another data processing system 3.

The method of performing the N-satellite tracking in a data processing system in accordance with the invention is described in FIG. 3 (a process diagram of the sequence of steps of the invention). Details of each step in FIG. 3 are discussed in the following section or, where required, given in an identified Table.

The invention is comprised of an iterative method of N-satellite tracking in which "new" observations from multiple satellites are used to create partial tracks which are then correlated with previously determined tracks (referred to as base tracks) for multiple targets. This is a significant distinction from the prior art. In the prior art, there were several known techniques by which individual returns could be added to an existing track. This invention correlates partial tracks with base tracks as described with more specificity below.

Referring to FIG. 3, the first step 310 of the invention is to establish the base tracks. In the two dimensional projection of FIG. 1A, three targets ($T_1$, $T_2$, and $T_3$) are being tracked and the base tracks for these targets are represented as $B_1$, $B_2$, and $B_3$. In FIG. 1A, the targets are assumed to be moving from "right" to "left." For simplicity, the points on the base tracks are assumed to each be associated with successive points in time: if point $O_1$ is to the right of point $O_2$, then $O_2$ occurred at a later point in time than $O_1$.

Figure 1B:
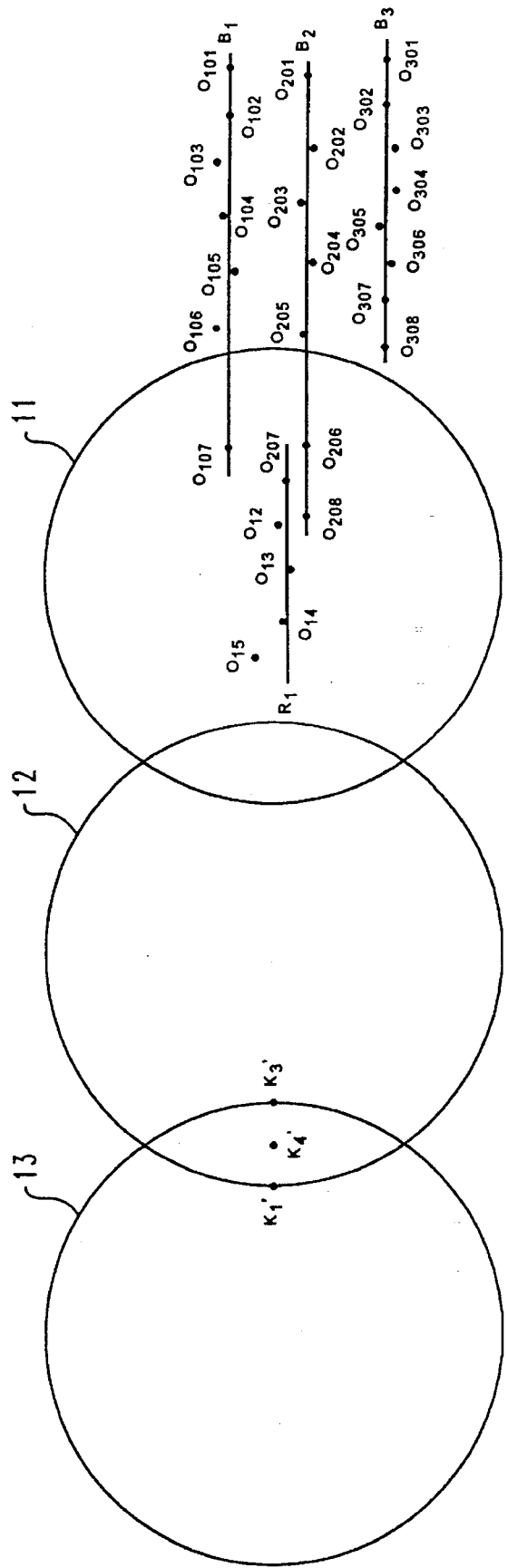
FIGS. 1B through 1D are representations of base tracks and resulting tracks from a view taken in a plane parallel to a plane tangent to the surface of the earth.

The base tracks are projections created from prior observations of the functions. This is illustrated in FIG. 1B. FIG. 1B is a two-dimensional projection of the same three dimensional area of space represented in FIG. 1A, however, in FIG. 1B the plane on which the projection is made is "parallel" to the surface of the earth. That is, it is perpendicular to the projection plane of FIG. 1A. Referring to FIG. 1B, it can be seen that base track $B_1$ is a projection based on the returns $O_{101}$, $O_{102}$, $O_{103}$, $O_{104}$, $O_{105}$, $O_{106}$, and $O_{107}$; base track $B_2$ is a projection based on the returns $O_{201}$, $O_{202}$, $O_{203}$, $O_{204}$, $O_{205}$, and $O_{206}$; base track $B_3$ is a projection based on the returns $O_{301}$, $O_{302}$, $O_{303}$, $O_{304}$, $O_{305}$, $O_{306}$, $O_{307}$ and $O_{308}$. To assist in understanding FIG. 1B, it will be noted that the circles 11, 12 and 13 of FIG. 1B are the projections of the respective perpendicular cross-sections of the areas of which Satellites $S_1$, $S_2$ and $S_3$ sweep. $K_1'$, $K_2'$, and $K_3'$ respectively are projections of the points $K_1$, $K_2$, and $K_3$ of FIG. 1A.

Referring to FIG. 3, the next step of the invention 320 is to receive "new" observations from multiple satellites. (The use of the term "new" in this context is somewhat unusual and is discussed in depth further on in this narrative.) These observations are grouped and used to create projections of the possible track of the targets. Various methods for performing this function are well known in prior art (See, for example, the method of probabilistic data association proposed by Bar-Shalom and Tse in "Tracking in a Cluttered Environment with Probabilistic Data Association," *Automatica*, Vol. 11, September 1975, pages 451–460) and will not be further discussed. Note that, when the method of the invention is first initiated, the first set of resulting tracks are used as the base tracks.

Referring to the two-dimensional projection given in FIG. 1A, the returns or observations of the satellites are indicated as the points $O_{ij}$. Since the preferred embodiment uses infrared sensing, the returns are in the form of x,y coordinates only (that is, the satellites can only sense the directional vector between it and the target; it cannot sense the distance along that vector between the target and itself. Each return is associated with a point in time, namely, the point in time when it was received by the satellites.

The line segments identified as Ri in FIG. 1A are representations of the tracks calculated from these observations. (line segment $R_k$ is calculated from the set of observations $O_{kj}$. (These tracks will be referred to as resulting tracks.) Since multiple returns are being received from closely spaced targets by multiple satellites almost simultaneously, it is possible that one of the "new" returns from a given satellite was also previously used to calculate the base tracks. Accordingly, the term "new" is used in this discussion to include such an occurrence.

The next step of the invention 330 in FIG. 3, is comprised of creating two sets or collections of tracks: the set of resulting tracks ($\{R_i\}$) and the set of base tracks ($\{B_i\}$). (In the case of initial observations of a set of targets, the set of observed tracks was used as the set of base tracks, $\{B_i\}$, there are no "new" tracks to correlated, and one proceeds to wait for the next set of resulting tracks.)

The purpose the invention is to select the correct member of the set $\{R_i\}$ which extends a specific member of the set $\{B_i\}$. Once a resulting track $R_k$ has been identified with a base track $B_j$ ("correlated"), the set of observations on which $R_k$ is based and the set of observations on which $B_j$ is based are combined and a final track projected from the final collection of observations using methods well known in the art. For a discussion of use of a least square batch filter which can be used to compute an update of the change in a state vector based on new information see Bierman, Factorization Methods for Discrete Sequential, pages 68–76.

The desired correlation occurs in a series of steps. In each step, a specific subset of $R_i$ is selected from the "pool" of resulting tracks and attempts are made to identify the member of the set $B_i$ with which it correlates. The resulting tracks which were either in the subset and failed some further test or not in the subset to start with, i.e. the tracks remaining the not yet correlated, then become the "pool" which is used by the next subsequent step. Throughout the correlation, however, certain fundamental principles are upheld. These are as follows:

1. returns are assigned to at most one base track. Therefore, if a resulting track Rk and a base track $B_j$ are correlated, the observation points that are in track $R_k$ are deleted from all other resulting tracks. Thus, if $R_k$ is the based on the observations $\{O_{k1}, O_{k2}, O_{k3}, O_{k4}\}$ and is correlated with $B_j$, and $R_s$ was based on the observations $\{O_{s1}, O_{s2}, O_{k2}, O_{s3}, O_{s4}\}$, then $O_{k2}$ is deleted from $R_s$ and if $R_s$ is correlated with another base track, only result $\{O_{s1}, O_{s2}, O_{s3}, O_{s4}\}$ will be used in that correlation;

2. once a resulting track is correlated with a base track it is never correlated with another base track. It is taken out of the "pool" of resulting tracks. Further, it will never be discarded; that is, it becomes a permanent part of the base track with which it is correlated;

3. resulting tracks are formed from the observations of one or two satellites only. Base tracks may be based on n satellite observations.

Since each return is allowed to be used in only one final track, the first step 340 of FIG. 3 in the series of attempted correlations is an attempt to resolve duplicates between the tracks. That is, the first steps use those "new" observations which were also used in projecting the base tracks.

Accordingly, in step 340, the preliminary subset of resulting tracks chosen is one in which the resulting tracks share a return in common with at least one base track. Graphically, this is the situation in FIG. 1B in which resulting track $R_1$ whose associated returns are the set consisting of $\{O_{207}, O_{12}, O_{13}, O_{14}, \text{ and } O_{15}\}$ and base track $B_2$ which is a based on the set of returns $\{O_{201}, O_{202}, O_{203}, O_{204}, O_{205}, O_{206}, \text{ and } O_{207}\}$.

Recall that satellites receive returns of a form (x,y) for each sweep. Thus, each return consists of x- and y-coordinates and an associated time or sweep. On this basis, in step 341, if a resulting track shares three or more returns with a base track (i.e. the x, y and time coordinates of the resulting track and the base track are approximately the same) and if there are at least four time periods of the satellites observation (scans) in which both the resulting track and the base track have observations (i.e. the resulting track and base track have four or more scans in common), then the resulting track and the base track are correlated. As an example, suppose the resulting track R1 had as it associated set of observations:

| $R_1$: | $O_{11}$ | $x_1$, | $y_1$, | $t_6$ |
|---|---|---|---|---|
| | $O_{207}$ | $x_{207}$, | $y_{207}$, | $t_7$ |
| | $O_{208}$ | $x_{208}$, | $y_{208}$, | $t_8$ |
| | $O_{209}$ | $x_{209}$, | $y_{209}$, | $t_9$ |
| | $O_{12}$ | $x_2$, | $y_2$, | $t_{10}$ |
| | $O_{13}$ | $x_3$, | $y_3$, | $t_a$ |
| | $O_{14}$ | $x_4$, | $y_4$, | $t_b$ |

Then $R_1$ would be correlated with a base track $B_2$ if $B_2$ had related observations of the form:

| $B_2$: | $O_{201}$ | $x_{201}$, | $y_{201}$, | t1 |
|---|---|---|---|---|
| | ... | | | |
| | $O_{206}$ | $x_{206}$, | $y_{206}$, | t6 |
| | $O_{207}$ | $x_{207}$, | $y_{207}$, | t7 |
| | $O_{208}$ | $x_{208}$, | $y_{208}$, | t8 |
| | $O_{209}$ | $x_{209}$, | $y_{209}$, | t9 | i.e. $R_1$ shares three common returns with $B_2$, viz: $O_{207}$, $O_{208}$, and $O_{209}$ and four common scans, t6, t7, t8 and t9.

In step 342 a similar type of basis for correlation is attempted. In this step, resulting tracks and base tracks will be correlated if the resulting track and the base track share two returns and the time overlap is two or three scans.

In step 343, a new "pool" of resulting tracks is formed. This step includes deleting from further consideration those tracks which were correlated with a base track. In addition, any observations in a correlated resulting track are deleted from the resulting tracks in the just created "pool".

Figure 1C:
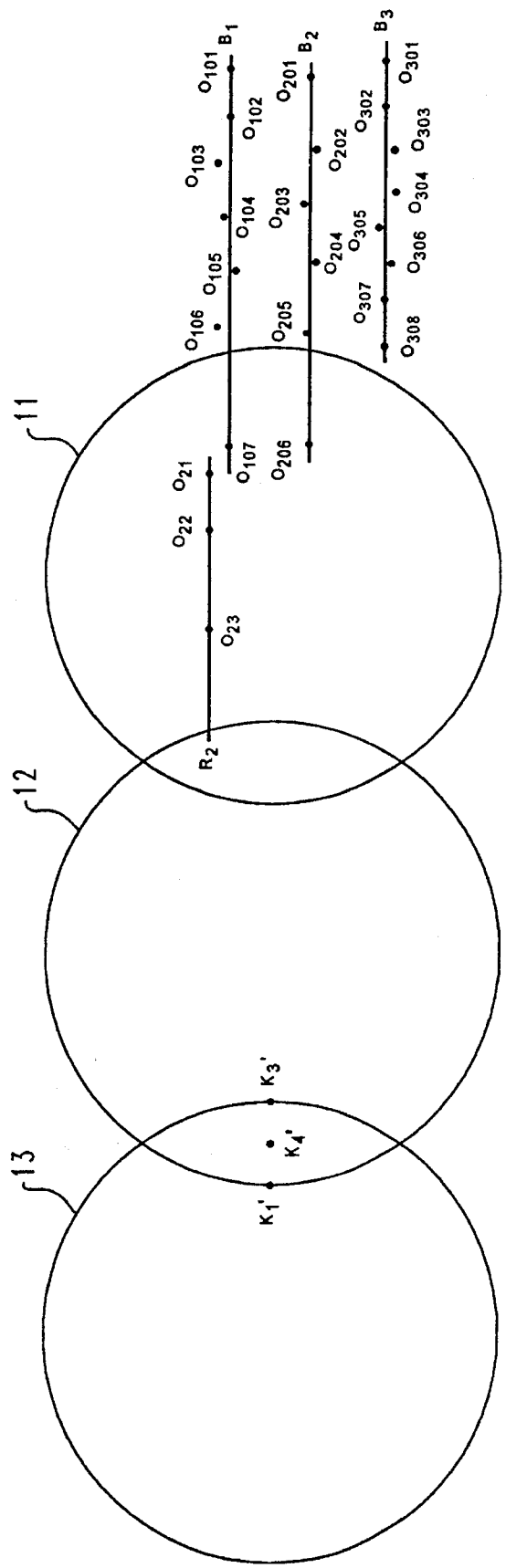

In step 350, correlations of track pairs which have a common satellite are attempted. That is, of the resulting track in the pool, each resulting track is paired with a base tracks where both the resulting track and the base track contain returns from a common satellite $S_k$. Referring to FIG. 1C, resulting track $R_2$ would be paired with $B_1$ since $B_1$ has an observation $O_{107}$ from satellite $S_1$ and $R_2$ has an observation from the same satellite (in actuality, three observations: $O_{21}$, $O_{22}$, and $O_{23}$). In step 351, those track pairs which have a time gap between the common satellite returns greater than a specified value V1 are eliminated from consideration for common satellite correlation. Thus, if $t_s$ is the time associated with return $O_s$, the requirement is:

Discard those $R_k$ repaired with $B_j$ where

V1>max{tmin ku–t max jv}

In step 352, if a pair passes this test, then three returns are selected from the resulting track and three returns are selected from the base track. The six returns are selected so that the times associated with the six points span the shortest possible time period. A goodness-of-fit score for the six return is calculated. That is, an estimate of the degree to which the collection of six returns is event-like is determined for each pair. Pseudo-code for this estimate if found in Table 1.

For each resulting track $R_k$, the scores for pairs consisting of $R_k$ and some base track $B_j$, are considered. The pair with the lowest score, provided that score is lower than some predefined variable V2, will be correlated.

In step 353, the new "pool" of resulting tracks is formed.

Figure 1D:
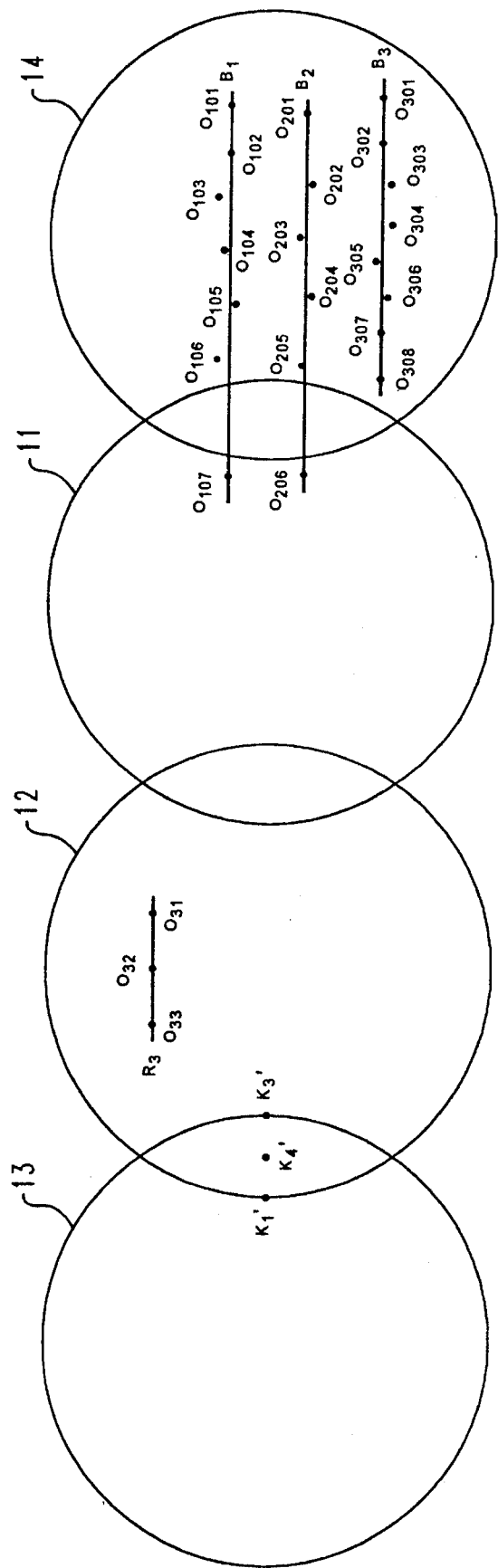

In step 360, correlation is attempted for pairs without a common satellite. Accordingly, for each resulting track remaining in the pool, pair that resulting track with those base tracks such that the observations from the resulting track are sourced from a different satellite than the observations from which the base tracks were projected. An example of tracks which would be paired is $R_3$ and $B_1$ in FIG. 1D. $R_3$ is a projection based on the returns $O_{31}$, $O_{32}$, and $O_{33}$ from satellite $S_2$ whose sweep is represented by circle 12. $B_1$ is a projection based on the returns $O_{101}$, $O_{102}$, $O_{103}$, $O_{104}$, $O_{105}$, $O_{106}$, and $O_{107}$ from a satellite $S_4$ whose sweep is represented by the circle 14.

In step 361, for each track in each track pair, the satellite which has the most returns for each track is selected. In the example in FIG. 1D, satellite $S_2$ (whose sweep is indicated by circle 12) would be chosen for $R_3$ and satellite $S_4$ for $B_1$. Only the returns from each track from the selected satellite are used in the correlation. Thus, only $O_{102}$, $O_{103}$, $O_{104}$, $O_{105}$, and $O_{106}$ would be used from $B_1$; all the returns from $R_3$ however (namely, $O_{31}$, $O_{32}$, and $O_{33}$) would be used. From these remaining returns for each track pair, three returns from each satellite where the associated times are either the same as or are closest to a time shared by both sets of observation are chosen. If the observations of the resulting track and the base track have no shared time, then the three observations with minimum time differences are chosen.

The maximum time difference between the three selected returns from the resulting track and the three selected returns from the base track is now computed. In essence, this is a measure of the total time span over which the six returns were observed. If the maximum is greater than a specified valued V3, then the pair is discarded at step 352 of FIG. 3.

For the each of the six returns, a coplanarity residual of the return, as measured using the two selected satellites $S_1$ and $S_2$ is determined at step 363 of FIG. 3. The coplanarity residual measures the extent to which planes of sight fail to converge. More specifically, the coplanarity residual for $O_i$ looks at the angle between:

1. a first plane, which is defined by the line between the satellites $S_1$ and $S_2$ and the line between satellite $S_1$ and observation $O_i$; and
2. a second plane, which is defined by the line between the satellites $S_1$ and $S_2$ and the line between satellite $S_2$ and observation $O_i$.

Figure 4:
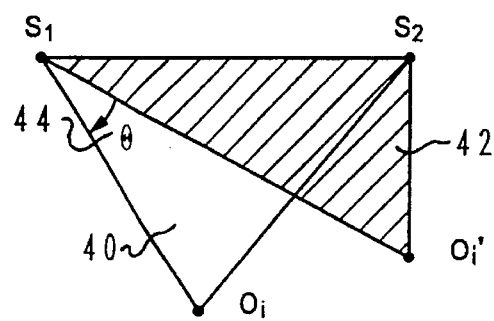
FIG. 4 illustrates the coplanarity residual.

In our situation, the returns were chosen precisely because they came from two different satellites. Accordingly, there will be no observed line between satellite $S_2$ and observation $O_i$. Instead, the time ti associated with the observation $O_i$ will be used and an $O_i$, interpolated for $S_2$ at that time from the observations of the other (base or resulting) track. If one refers to FIG. 4, the consequences of the resulting track and the base track not corresponding will be seen. In FIG. 4, plane 40 is formed by the satellites $S_1$ and $S_2$ and the observation $O_i$. Plane 42 is formed by the satellites $S_1$ and $S_2$ and the interpolated observation at time ti, $O_i'$. Since the base track was assumed to not correlate with the resulting track, $O_i$ and $O_i'$ are truly two different points. Hence the planes are different and the angle θ 44 is not zero. As $O_i$ and $O_i'$ converge, the angle θ gets smaller. Thus, a small coplanarity residuals is strongly suggestive of proper correlation.

Table 2 gives the calculation of the coplanarity residual. The result of this calculation, Step 363, is a collection of six coplanarity residuals, sin $θ_i$ where i=1, . . . 6. This coplanarity residual, or more precisely the angle θ, is used to calculate an estimate of the three dimensional position $\vec{P}^{ecf}$ of each of the six returns in earth fixed coordinates (ECF) at step 364 FIG. 3.

Table 3 gives the calculation of position.

In Step 365, an estimate of velocity of the track is obtained from calculation of the delta position divided by the delta time (or the numerical derivative). An alternative method is to use a filter on the three-dimensional vectors $\vec{P}^{ecf}$.

In step 366, the position and velocity and the six returns are submitted to an analytical tracker. The steps used in this tracker in the current embodiment are described in Table 4. As can be seen from that Table, the tracker determines a goodness-of-fit score, referred to as the GATT-score.

In step 367, the track pair (i.e. a resulting track and a base track) with scores less than a predefined value V5 are considered possible candidates for correlation. The pair with the best (i.e. lowest) scores are chosen. In the event that there is more than one track pair with the same acceptable GATT score, the average of the coplanarity residuals calculated in Step 355 for the six selected observations in the track is computed. The pair with the smallest average is actually correlated.

In step 368, the "pool" of remaining track pairs is determined.

In Step 370, the remaining tracks are paired with each of the base tracks and profile dependent piece correlation is attempted. Profile dependent piece correlation depends on having identified the target to the extent that its behavior can be somewhat predicted.

The initial step of this correlation is to establish profiles of the targets based on the pre-existing base tracks. Profiles of a number of types of targets, based on movement characteristics, are developed and stored prior to use of the invention. Each base track is (tentatively) identified as of the type of one of these stored targets. The identified profile can then be used with the base track and a three state least squares batch filter, to develop three states of phase time, azimuth, and loft along with the estimated position of a reference point in three dimensional space for the base track.

When a resulting track is paired with a base track, the profile (the states and position from the typing fit process) of the base track is used to compute predicted positions (in earth-centered fixed (ECF) coordinates) of the target during the time scans of the resulting track. The projections of these predictions in the reference frames of the satellites observing the resulting track are then computed. These predicted returns are compared with the returns of the new resulting track. If the distance between the predicted returns and the new resulting track returns are close enough, then a least squares fit score of the old base track and the new resulting track is computed using the filter described in Table 5.

The filter in Table 5 produces a goodness-of-fit score which measures the fit of the resulting track and the projections based on the profile of its paired base track. If the predicted returns are not close enough to the new resulting track (i.e. the goodness-of-fit score is greater than a specified value V6), then that old base track is no longer considered for correlation to that particular resulting track. For each resulting track, of the possible base tracks with which it has an acceptable goodness-of-fit score, the resulting track is correlated to that base track which produces the lowest score.

The final step, 380, is comprised of taking all those resulting tracks which have not been correlated with a base track and adding them (the resulting tracks) to the set of base tracks. In other words, any resulting track which has not been correlated in the preceding steps is assumed to be the track of a new target.

Although a specific embodiment of the invention has been disclosed, it will be understood, by those having skill in the art, that changes can be made to the specific embodiment without departing from the spirit and scope of the invention.

TABLE 1

```
Start Procedure
Loop 1: loop over returns I
    Perform least squares batch to obtain estimate on x (velocity
    and thrust)
        X1 and X2 are the x,y coordinates for velocity
        X3 and X4 are the x,y coordiantes for thrust
    Perform same estimate for Y (?????)
Loop 2: loop over returns I
    Take the time difference for return I and its square:
        T = DT(I)
        T2 = T**2
    calculate a jerk term F for thrust in the last half of the
    time period of the return
    calculate a predicted X (AP) and predicted Y (EP):
        AP = T*X(1) + X(3)*(F + T2)
        EP = T*X(2) + X(4)*(F + T2)
    calculate the difference between the Predicted value and
    observed value for X and Y:
        DY1 = (AP − A(I))/Sigma X
        DY2 = (EP − E(I))/Sigma Y
            where A = Delta X in LOS' coordinates
                  E = Delta Y in LOS' coordinates
    Goodness of fit score:
        PHI = PHI + DY1**2 + DY2**2
End Procedure
```

TABLE 2

Determination of Coplanarity Residual

The "coplanarity residual" measures the extent to which the two lines of sight fail to converge. To compute the computation coplanarity residual where two different satellites observe returns at similar times, use interpolation to estimate line of sight vectors from each satellite at a common time. The vector difference of the satellite vectors $\vec{S}_2^{ecf} - \vec{S}_1^{ecf}$ and a line of sight vector $\vec{L}_{1 \, or \, 2}^{ecf}$ defines a plane in ECF coordinates. If the normal unit vector $\hat{S}_n^{ecf}$ to this plane is formed and vector dotted into the other unit line of sight vector, $\hat{L}_{2 \, or \, 1}^{ecf}$, the result is $\cos\theta$ where $\sin\theta$ is defined coplanarity residual. It is a measure of the coplanarity of the satellite difference vector $\vec{S}_d^{ecf}$ and the two line of sight vectors $\vec{L}_1^{ecf}$ and $\vec{L}_2^{ecf}$.

$$\cos\theta = \hat{L}_1^{ecf} \cdot \frac{(\vec{S}_2^{ecf} - \vec{S}_1^{ecf}) \times \hat{L}_2^{ecf}}{|(\vec{S}_2^{ecf} - \vec{S}_1^{ecf}) \times \hat{L}_2^{ecf}|}$$

then $\cos^{-1}(\cos\theta) = \theta$
and
$\sin\theta$ is the coplanarity residual.
where:

$\vec{S}_1^{ecf}$ is the satellite position vector to satellite one in ECF coordinates. Note that all computations are performed at the same time reference.

$\vec{S}_2^{ecf}$ is the satellite position vector to satellite two in ECF coordinates $\hat{L}_1^{ecf}$ is the interpolated unit line of sight vector in ECF coordinates from satellite one to the return.

$\hat{L}_2^{ecf}$ is the interpolated unit line of sight vector in ECF coordinates from satellite two to the return.

TABLE 3

Triangulation of Returns Seen by Two Satellites

The following triangulation equations are used to compute the 3-dimensional position vector of the returns, in earth-fixed coordinates (ECF), at a common reference time. The variables are identified in Table 2.

$$|\vec{L}_1^{ecf}| = (\vec{S}_2^{ecf} - \vec{S}_1^{ecf}) \cdot \frac{\hat{L}_1^{ecf} - \hat{L}_2^{ecf}\cos\theta}{\sin^2\theta}$$

$$|\vec{L}_2^{ecf}| = (\vec{S}_2^{ecf} - \vec{S}_1^{ecf}) \cdot \frac{\hat{L}_2^{ecf} - \hat{L}_1^{ecf}\cos\theta}{\sin^2\theta}$$

Then $\vec{L}_1^{ecf}$, $\vec{L}_2^{ecf}$ are obtained from:

$\vec{L}_1^{ecf} = \hat{L}_1^{ecf}|\vec{L}_1^{ecf}|$ $\vec{L}_2^{ecf} = \hat{L}_2^{ecf}|\vec{L}_2^{ecf}|$ Then the triangulated position is defined as the average of the two positions projected by the above equations and is given by:

$\vec{P}^{ecf} = 0.5(\vec{P}_1^{ecf} + \vec{P}_2^{ecf})$ $\vec{P}_1^{ecf} = \vec{S}_1^{ecf} + \vec{L}_1^{ecf}$ $\vec{P}_2^{ecf} = \vec{S}_2^{ecf} + \vec{L}_2^{ecf}$ Using the law of sines, $$\frac{|\vec{S}_2^{ecf} - \vec{S}_1^{ecf}|}{\sin\theta} = \frac{|\vec{L}_2^{ecf}|}{\sin A} = \frac{|\vec{L}_1^{ecf}|}{\sin B} \quad (8)$$

Consequently, $$|\vec{L}_2^{ecf}| = |\vec{S}_2^{ecf} - \vec{S}_1^{ecf}| \frac{\sin A}{\sin\theta} \quad (9)$$

$$|\vec{L}_1^{ecf}| = |\vec{S}_2^{ecf} - \vec{S}_1^{ecf}| \frac{\sin B}{\sin\theta} \quad (10)$$

Now $$\cos A = -\cos(\theta + B) = \sin\theta \sin B - \cos\theta \cos B \quad (11)$$

Transposing, $$\sin B = \frac{\cos A + \cos B \cos\theta}{\sin\theta} \quad (12)$$

Substituting sinB in law of sines equation:

TABLE 4

Generalized Analytic Tracker Score (GATT)

The returns are assumed to be in the Mission Reference Frame (MRF) coordinate system with $X_i$, $Y_i$, and $Z_i$ the individual returns. The vector notation for these returns is $X_i^{mrf}$. (The MRF is an east-north-up coordinate system nominally centered at the satellite. More precisely it is a coordinate system with the x-axis pointing east, the y-axis pointing north, and the z-axis pointing from earth center center toward the satellite. In prior art, it was sometimes referred to as the ARF frame.)

Associated with the time of each returns is the satellite position $\vec{S}_i$.

The steps in the generalized analytic tracker are as follows:

count the number of returns from each of the satellite data sources. This count is used in calculating the average line of site bias.

calculate the delta time of each return based upon the specified reference time. The delta time squared is calculated and saved. The minimum and the maximum time of all the return times is found. The middle time is calculated as the average of the maximum and the minimum time.

fine the satellite position for the respective satellite is found for the time for each return.

calculate the Earth-Centered Fixed frame (ECF) to Line of Sight (LOS) transformation matrix for each return. (ECF is an earth-centered coordinate frame whose x and y axis lie in the equatorial plane at respective longitudes of 0 and 90 degrees, and whose z-axis points toward the north pole.) Calculating the ECF to LOS matrix is done in two parts. The first part is to calculate the ECF to MRF transformation matrix $T_{mrf}^{ecf}$ and the second part is to calculate the MRF to LOS transformation $T_{los}^{mrf}$.

The ECF to MRF transformation depends upon the satellite position and it calculated for the time of each return. If we have the satellite position vector $S_{ti}$ for the satellite position at the time of return $i^{th}$ return with x, y, and z components $\vec{S}_x$, $\vec{S}_y$, and $\vec{S}_z$, we can calculate the ECF to MRF transformation as follows:

$$T_{ecf}^{mrf} = \begin{bmatrix} \frac{-S_y}{\sqrt{S_x^2 + S_y^2}} & \frac{S_x}{\sqrt{S_x^2 + S_y^2}} & 0 \\ \frac{-S_z S_x}{|S|\sqrt{S_x^2 + S_y^2}} & \frac{-S_z S_y}{|S|\sqrt{S_x^2 + S_y^2}} & \frac{\sqrt{S_x^2 + S_x^2}}{|S|} \\ \frac{S_x}{|S|} & \frac{S_y}{|S|} & \frac{S_z}{|S|} \end{bmatrix}$$

The second transformation for the MRF to the LOS coordinate system is calculated as below with the transformation being a function of the return values.

$$T_{mrf}^{los} = \begin{bmatrix} \frac{CAZ}{SIGX} & \frac{-SAZ}{SIGX} & 0 \\ \frac{CEL \times SAZ}{SIGY} & \frac{CEL \times CAZ}{SIGY} & \frac{SAZ}{SIGY} \end{bmatrix}$$

$$SEL = \sqrt{1 - Z^2}$$
$$CEL = -Z$$
$$SAZ = \frac{X}{SEL}$$
$$CAZ = \frac{Y}{SEL}$$

SIGX and SIGY are the standard deviations for the x and y return values. This standard deviations may by different for different returns.

X, Y, and Z are the MRF coordinate values for each return.

$$\vec{T}_{ecf}^{los} = T_{mrf}^{los} \times T_{ecf}^{mrf}$$

This transformation is computed for each return sent to the generalized analytic tracker filter. There are only two rows in the final transformation because only the x and y values in the LOS coordinate frame are needed. In addition to the transformation from the ECF to the LOS coordinate system The next step in the generalized analytic tracker filter is to initialize the states and to get the estimated event position in ECF coordinates. There may be anywhere from four to seven states depending upon the use of the filter. The number of states is defined and constant for a particular use of the filter. The estimate of the event position is make at the reference time which is another input to the filter.

Another transformation that is similar to the ECF to LH (local horizontal) transformation is calculated in this step. The LH transformation has the center at the event origin and the z axis along the local vertical vector and the y axis pointing north and the x axis east. This transformation is the same except that the z axis point along the event position vector rather than the local vertical. The event position vector goes through the ECF coordinate system center while the local vertical usually does not go through the center.

The transformation depends upon the event position and is calculated for the reference time. If we have the event position vector $\vec{P}_{tr}$ for the event position at the reference time with x, y, and z components $\vec{P}_x$, $\vec{P}_y$, and $\vec{P}_z$, we can calculate this transformation as follows. Where $\vec{T}_{pos}^{ecf}$ is the transformation from the ECF coordinate system to the coordinate system based upon the event position vector.

$$T_{ecf}^{pos} = \begin{bmatrix} \dfrac{-P_y}{\sqrt{P_x^2+P_y^2}} & \dfrac{P_x}{\sqrt{P_x^2+P_y^2}} & 0 \\ \dfrac{-P_zP_x}{|\vec{P}|\sqrt{P_x^2+P_y^2}} & \dfrac{-P_zP_y}{|\vec{P}|\sqrt{P_x^2+P_y^2}} & \dfrac{\sqrt{P_x^2+P_x^2}}{|\vec{P}|} \\ \dfrac{P_x}{|\vec{P}|} & \dfrac{P_y}{|\vec{P}|} & \dfrac{P_z}{|\vec{P}|} \end{bmatrix}$$

In the next step the event position at the time of the $i^{th}$ return is calculated assuming the event is affected only by gravity since the reference time.

$$DP_x = \left( P_x - \frac{gT^2P_x}{2|\vec{P}|} \right)$$

$$DP_y = \left( P_y - \frac{gT^2P_y}{2|\vec{P}|} \right)$$

$$DP_z = \left( P_z - \frac{gT^2P_z}{2|\vec{P}|} \right)$$

where g is the earth gravitational constant and T is the time of the returns minus the reference time. This time was computed in an earlier step. The delta position due to gravity will be used later in the algorithm.

After making the above calculations, the remainder of the generalized analytic tracker is performed in an iteration loop. This loop begins with this step. For each iteration the states and the associated goodness-of-fit score are updated. The required initial state estimates are provided by the calculations in Steps 365 and 366. In the iteration loop it is necessary to know how many state are to be use. There can be from four to seven states used as follows:

State 1—Velocity in ECF in X direction. $V_x$

State 2—Velocity in ECF in Y direction. $V_y$

State 3—Velocity in ECF in Z direction. $V_z$

State 4—One half the ratio of acceleration magnitude velocity magnitude for the first half of time window of the returns. $K_1$ State 5—One half the ratio of acceleration magnitude velocity magnitude for the second half of time window of the returns. If the fifth state is not used that State 4 applies to the second half of the time window. $K_2$ State 6—Yaw angle at the reference angle. Yaw is the side to side turn. YAW State 7—Pitch angle at the reference angle. Pitch is the up and down motion of the event. PIT If a state is used all previous states must be included. That is if the YAW state is used then $K_1$ and $K_2$ must be included.

The velocity as given in the first three state is obtained and is noted by $\vec{V}_{tr}$. The acceleration at the reference time is calculated by:

$$\frac{\vec{A}_{tr}}{2} = K_1 \vec{V}_{tr}$$

If the sixth or seventh states are be used by the algorithm, the acceleration vector $\vec{A}_{tr}$ in the ECF coordinate system is transformed to the POS coordinate system defined above by $\vec{T}_{pos}^{ecf}$ $$\vec{A}_{tr}^{pos} = \vec{T}_{ecf}^{pos} \times \vec{A}_{tr}^{ecf}$$

The vector $\vec{A}_{tr}^{pos}$ is then rotated about the z axis of the POS coordinate system by the YAW angle. The rotation transformation is as follows:

$$\vec{R}_z = \begin{bmatrix} \cos(YAW) & \sin(YAW) & 0 \\ -\sin(YAW) & \cos(YAW) & 0 \\ 0 & 0 & 1 \end{bmatrix}$$

If state seven is used, then the vector $\vec{A}_{tr}^{pos}$ is also rotated about the x axis of the POS coordinate system by the PIT angle. The rotation transformation is as follows:

$$\vec{R}_x = \begin{bmatrix} 1 & 0 & 0 \\ 0 & \cos(PIT) & \sin(PIT) \\ 0 & -\sin(PIT) & \cos(PIT) \end{bmatrix}$$

The acceleration in the ECF coordinate system has been transformed into the POS coordinate system which is very similar to the local horizontal coordinate system except that the position vector is used rather than the local vertical as the z or up axis. The acceleration vector has then in this coordinate system been rotated by the yaw and also the pitch if the last states are used in the algorithm. Next it is necessary to transform the acceleration vector back to the ECF coordinate system. This is done with the transpose of the ECF to POS transformation.

$$\vec{A}_{tr}^{ecf} = \vec{T}_{ecf}^{pos\,t} \times \vec{R}_x \times \vec{R}_z \times \vec{A}_{tr}^{pos}$$

For a coordinate transformation, the transpose of the matrix is equal to the inverse of the matrix.

Having rotated the acceleration vector by the yaw and pitch angle, it is not possible to estimate the event motion. This is calculated in the ECF coordinate system. There is motion due to three different sources in the estimate. The first is due to gravity and is given previously by $\vec{DP}$, the second is due to the event velocity at the reference time $V_{tr}^{ecf}$, and the third is due to the event acceleration. The direction of the acceleration vector is different from the velocity vector by the yaw and pitch angles. After calculation the event position in the ECF coordinate system, the satellite position is subtracted giving the vector from the satellite to the event. The equation is shown below.

$$\vec{D}_i^{ecf} = \left( \vec{DP}_i + \vec{V}_{tr}^{ecf} \times T_i + \frac{\vec{A}_{tr}^{ecf} \times T_i^2}{2} \right) - \vec{S}$$

This vector is calculated at the time of event return and is the event position estimated from the algorithm states.

The vector from the satellite to the event calculated above is in ECF coordinates. The next step is the transform each of the position to the LOS coordinate system of that return. This is done as follows. Notice that there is a transformation matrix for every return since the LOS coordinate system of each return is used rather that just the LOS coordinate system of a single return.

$$\vec{D}_i^{los} = \frac{\vec{T}_{mrft}^{los} \times \vec{T}_{ecft}^{mrf} \times \vec{D}_i^{ecf}}{|\vec{D}_i^{ecf}|}$$

The LOS vector becomes a unit vector by dividing by the magnitude of the vector. This then is the estimate x and y values of the event in the LOS coordinate system. It should be emphasized that this is the estimate event positions based on the algorithm states and not the measured event position. The measured event position become zero in the LOS coordinate system of that individual return. The information that was in the event return is transferred to the transformation matrices. Since the measured position is zero, the measured minus the estimated event position is simply the negative of the estimate position. The measured minus the estimated event position is later used in the square root information filter. It is calculated here and saved for later use.

In the generalized analytic tracker algorithm, average LOS coordinates are used. This is not shown in the above equation, but is accomplished at this point simply by subtracting the average of the estimated x and y values of the event position. That is the average of the x values is subtracted from the x estimate and the average of the y values is subtracted from the y values. The average of the measured values is zero since all the values are zero so in effect the measured returns are already in the average LOS coordinates.

A test score based upon the sum of the squares of the measured values minus the estimated values is calculated by forming the square and then summing the x values and the y values of $\vec{D}_i^{los}$. If this test score is less than a limit (usually 1.5) or has not change more than 3 percent since the last iteration, it is assumed that the algorithm has converged to the desired estimate of the states and the iteration loop is stopped and the algorithm completed. If the score does not meet the above condition then the iteration loop is continued and the next step is to enter the state loop where the gradient matrix is computed. The iteration loop can also be stopped at this point if the iteration counter reaches the iteration limit. This limit typically is set between five and ten.

The gradient matrix is defined as shown in the following equation.

$$H_k = \frac{\partial f(X)}{\partial X}\bigg|_{X=X_k} \approx \frac{f(\hat{X}_k + \Delta X) - f(\hat{X}_k)}{\Delta X}$$

$\hat{X}_k$ is the estimated state variable and $f(\hat{X}_k)$ is the estimated LOS position that has been described above. The actual gradient matrix is approximated as shown above by using the state estimate modified by a small term $\Delta X$. This is similar to approximating numerically in scalar form the derivative of y with respect to x by dividing $\Delta y$ by $\Delta x$.

The gradient matrix $H_k$ is calculated in the next step of the algorithm. It is done in the state iteration loop one state at a time. Each state represents one column of the gradient matrix.

Begin the state loop. In this loop, one state is considered at a time. The value of that particular component of $\Delta X$ is added is added to the current state estimate $\hat{X}_k$ and the $f(\hat{X}_k + \Delta X)$ is calculated for the perturbed state estimate. The equations for $f(\hat{X}_k + \Delta X)$ are the same as for $f(\hat{X}_k)$ except for the values of the state that are used. The equations for the function have are the equations that have been explained.

With $f(\hat{X}_k + \Delta X)$ and $f(\hat{X}_k)$ calculated, the gradient is found by dividing by $\Delta X$. In each iteration of the state loop one column of the gradient matrix is calculated and stored. The state loop is completed after each column of the gradient matrix has been calculated. The state loop is ended here.

Using the gradient computed above and the measured minus the estimated event positions, an update to the state estimate is calculated with the square root information filter. This filter was described in the monocular processing section.

The update to the state value is added to the current state estimate and th resulting states are checked for some limit constraints.

The iteration loop ends at this point

TABLE 5

Three State Filter

Step 1: estimate phase time, track azimuth, and loft (loft, is usually estimated initially as zero), of the observations and the standard deviation of that estimate. Determine the measurement error standard deviation.

Step 2: determine the observation position in ECF coordinates at the time of the earliest return. One method of obtaining these coordinates is to calculate a sphere about the center of the earth at the estimated altitude of the observation and to intersect the sphere with the LOS (line of sight) vector of the observation.

Step 3: transform the returns to LOS coordinates: The three state filter operates in the LOS coordinate frame of each return. By using the LOS coordinate frame of each return rather than just the LOS coordinate frame of the first return, all the measured returns have a zero values. The position information of the returns is not lost, however, because it becomes part of the transformation matrix from the MR (mission reference) frame to the LOS reference frame. A separate transformation matrix is required for each return.

If $X_{MR}$ is a return unit vector in the MR frame and x, y, and z are the values of respective coordinates of the return, the return can be written as follows.

$$X_{MR} = x\hat{x} + y\hat{y} + z\hat{z}$$

where $\hat{x}$, $\hat{y}$, and $\hat{z}$ are the coordinate frame axis unit vectors. Since the returns represent a unit vector, it is true that $$\sqrt{x^2 + y^2 + z^2} = 1$$

Using the return values, a coordinate transformation from the MR frame to the LOS frame can be computed. The coordinate transformation matrix is as follows:

$$X_{LOS} = \begin{bmatrix} \frac{y}{\sqrt{x^2+y^2}} & \frac{-x}{\sqrt{x^2+y^2}} & 0 \\ \frac{-zx}{\sqrt{x^2+y^2}} & \frac{-zy}{\sqrt{x^2+y^2}} & \sqrt{x^2+y^2} \\ -x & -y & -z \end{bmatrix} X_{MR}$$

Where $X_{LOS}$ and $X_{MR}$ are the return position vector in the LOS and the MR frames respectively.

The above transformation is defined for a single return. Similar transformations can be calculated for every return. Transforming the return itself from the MR frame to the LOS frame produces zero x and y values. Even though x and y are zero in the LOS coordinate frame, the original measured information is still available in the MR to LOS transformations. The x value is −1 but is not used in the filter. This can be seen in the transformation above. The same transformations will be used in the three state filter to transform the predicted return values into the LOS frame. These values will not be zero. Since the measured LOS return values are zero while the predicted return values are not zero, to calculate the difference between the measured and the predicted just require using the negative of the predicted value.

Step 4: In the three state filter, the position of the predicted returns are calculated in the ECF frame. To convert these values into the LOS frame the above transformation is used but first the predicted returns must be transformed from the ECF frame to the MR frame. To do this the satellite position at the time of each return must be available. This information is passed to the filter along with the returns. If $S_{ECF}$ is the satellite position vector, then a unit vector $\hat{S}_{ECF}$ can be be formed so that $s_x$, $s_y$, and $s_z$ are the respective coordinate values. Then $$\hat{S}_{ECF} = x_x \hat{x} + s_y \hat{y} + s_z \hat{z}$$

and since $\hat{S}_{ECF}$ is a unit vector $$\sqrt{s_x^2 + s_y^2 + s_z^2} = 1$$

The transformation from the ECF frame to the MR frame is given by the follow:

$$X_{MR} = \begin{bmatrix} \frac{-s_y}{\sqrt{s_x^2+s_y^2}} & \frac{s_x}{\sqrt{s_x^2+s_y^2}} & 0 \\ \frac{-s_z s_x}{\sqrt{s_x^2+s_y^2}} & \frac{-s_z s_y}{\sqrt{s_x^2+s_y^2}} & \sqrt{(s_x^2+s_y^2)} \\ s_x & s_y & s_z \end{bmatrix} X_{ECF}$$

Step 5: Using the above two transformation, first the ECF to MR and second the MR to LOS, the predicted return positions are converted to the LOS frame to be compared with the measured returns. The measured returns in the LOS frame are zero. Using these transformations allows the exact satellite motion to be used in the filter.

In the filter, the predicted event positions are calculated in the ECF coordinate frame using a representative event profile, the filter states, and an estimate of the event initiator position in the ECF coordinate frame. If the initiator position is not provided to the filter, it is estimated by the filter. The transformation in the filter from the ECF and MR frames to the LOS frame take into account the actual satellite motion of each return. In addition to using the LOS frame of each return to account for actual satellite motion, the filter uses an average LOS reference to account for any satellite bias errors. This is done for both the x and the y predicted values by subtracting the average x and y values from each term. This implies that the filter models relative event motion but not absolute event position In previous LPS systems the positions of the track initiator was subtracted from the position of the other returns. In SPS/MGT a method of successive differences was used.

Step 6: three state filter is mathematically a nonlinear least squares filter with an iterative solution. The model that describes the relationship between the measurements and the states is represented by the following matrix equation $$Y = f(X) + v$$

where $f()$=the nonlinear function that relates the filter states (phase time, azimuth, loft) to the predicted LOS returns.

X=The three element state vector.

Y=the m element measurement vector consisting of the difference between the measured LOS values and the predicted LOS values. The measured LOS values are zero by definition of the LOS frame.

v=The random measurement error where E[v]=0

To solve this model for X requires an initial estimate of X denoted by $\hat{X}_0$ and the weighting matrices W and R. These two matrices weighting matrices are defined as follows $$R = \begin{bmatrix} \sigma_1 & & 0 \\ & \ldots & \\ 0 & & \sigma_n \end{bmatrix}$$

where $\sigma_i$ is the weighting factor of the $i^{th}$ state of the initial estimate of the state vector and $$W = \begin{bmatrix} \omega_1 & & 0 \\ & \ldots & \\ 0 & & \omega_m \end{bmatrix}$$

where $\omega_j$ is the weighting factor of the $j^{th}$ measurement values. In the least squares problem, R and W are weighting matrices. In the stochastic problem, these terms are the covariance matrix of the initial state estimate and the the measurement covariance matrix respectively. These matrices determine the relative effect in the final estimate of X between the information in $\hat{X}_0$ and the measurement data Y.

To find the best estimate of X in a least squares sense, a cost function is defined as follows:

$$Q = [Y - f(X)]^t W^2 [Y - f(X)] + (\hat{X}_0 - X)^t R^2 (\hat{X}_0 - X)$$

We want to find a value of X such that Q is minimized. This value of X will be called $\hat{X}_{ls}$. In general, it is not possible to calculate the value of $\hat{X}_{ls}$. Instead the value $\hat{X}_k$ where $\hat{X}_k$ is the $k^{th}$ solution for the iterative equation will be calculated.

$$\hat{X}_{ls} = \lim_{k \to \infty} \hat{X}_k$$

Since the problem is nonlinear we must define a gradient matrix that is a function of the value of X $$H_k = \frac{\partial f(X)}{\partial X} \bigg|_{X=X_k} \approx \frac{f(\hat{X}_k + \Delta X) - f(\hat{X}_k)}{\Delta X}$$

Using the gradient matrix $H_k$ and the other arrays discussed, a value of $\hat{X}_k$ can be calculated. The derivation of $\hat{X}_k$ is not included here but the final equation is as follows:

$$\hat{X}_{k+1} = \hat{X}_k + (H_k^T W^2 H_k + R^2)^{-1} \{H_k^T W_2 [Y - f(\hat{X}_k)] + R^2 (\hat{X}_0 - \hat{X}_k)\}$$

$H_k$ must be evaluated for each iteration because of the nonlinear model.

To solve the above equation for $\hat{X}_{k+1}$ it is necessary to have the previous estimate $\hat{X}_k$ and the original estimate $\hat{X}_0$. The weighting matrices R and W determine how much the original estimate $\hat{X}_0$ effects the solution as compared with the effect of the measurement data. In practice, the value of k is not allowed to be larger than five to ten. For this number of iterations $\hat{X}_k$ usually converges close to $\hat{X}_{ls}$.

What is claimed is:

1. In a tracking system, comprised of a plurality of satellite tracking stations orbiting above the surface of the earth, operatively connected to a data processing system, a computer method for tracking a plurality of targets, comprising the steps of:

receiving a first plurality of returns from said plurality of satellite tracking stations and using said first plurality of returns to create a plurality of base tracks, each return of said first plurality of returns having an associated time, and each of said base tracks having an associated set of returns;

receiving a second plurality of returns from said plurality of satellite tracking stations and using said second plurality of returns to create a first plurality of resulting tracks, each return of said second plurality of returns having an associated time, and each of said resulting tracks having an associated set of returns;

creating a set of first pairs, each of said first pairs comprised of a first resulting track selected from said first plurality of resulting tracks and an associated first base track selected from said plurality of base tracks, where said first resulting track and said associated first base track have at least one common return;

correlating each of said first resulting tracks with said associated first base track;

removing said correlated first resulting tracks from said first plurality of resulting tracks creating a second plurality of resulting tracks;

creating a set of second pairs, each of said second pairs comprised of a second resulting track selected from said second plurality of resulting tracks and an associated second base track selected from said plurality of base tracks, where said second resulting track and said associated second base track have at least one satellite in common;

for each second pair, calculating an associated time gap where said gap measures the maximum length of time between the time associated with a return from said second resulting track and said time associated with a return from said second base track;

removing from said set of second pair second each second pairs having an associated time gap greater than a first specified value, creating a remaining set of second pairs;

calculating a goodness-of-fit score for each pair in said remaining set of second pairs;

removing from said set of second pairs each second pair having a goodness-of-fit score greater than a second specified value;

correlating each of said second resulting tracks remaining in said set of second pairs with said associated second base track;

removing said correlated second resulting tracks from said second plurality of resulting tracks creating a third plurality of resulting tracks;

creating a set of third pairs, each of said third pairs comprised of a third resulting track selected from said third plurality of resulting tracks and an associated third base track selected from said plurality of base tracks, where said third resulting track and said associated third base track have no satellite in common;

calculating a goodness-of-fit score for each pair in said set of third pairs;

removing from said set of third pairs each third pair having a goodness-of-fit score greater than a third specified value;

correlating each of said third resulting tracks remaining in said set of third pairs with said associated third base track;

removing said correlated third resulting tracks from said third plurality of resulting tracks creating a fourth plurality of resulting tracks;

creating a set of fourth pairs, each of said fourth pairs comprised of a fourth resulting track and a fourth base track, said fourth pairs created by pairing each of said fourth plurality of resulting tracks with each of said plurality of base tracks;

using profile dependent piece correlation to correlate said fourth resulting track with said fourth base track and calculating a goodness-of-fit score for each of said fourth pairs;

if said goodness-of-fit score for a fourth pair is greater than a fourth specified value, including said fourth resulting in said plurality of base tracks.

2. A method as in claim 1 wherein said first set of pairs is further comprised of a three-return set of pairs and a two-return set of pairs, wherein:

said first track of said three return set of pairs and said second track of said three return set of pairs have at least three common returns and at least four scans in common; and said first track of said two-return set of pairs and said second track of said two-return set of pairs have two common returns and three scans in common.

3. A method as in claim 1 which further includes:

removing said returns associated with said correlated first resulting tracks from said returns associated with each of said resulting tracks in said first plurality of resulting tracks;

removing said returns associated with said correlated second resulting tracks from said returns associated with each of said resulting tracks in said second plurality of resulting tracks; and removing said returns associated with said correlated third resulting tracks from said returns associated with each of said resulting tracks in said third plurality of resulting tracks.

4. A method as in claim 1 wherein calculating a goodness-of-fit score for each pair in said set of third pairs further includes the steps of:

selecting a third resulting track;

selecting a return satellite tracking station from said plurality of satellite tracking stations for said selected third resulting track;

selecting a base satellite tracking station from said plurality of satellite tracking stations for said associated third base track of said selected third resulting track;

selecting three returns from said selected third resulting track and three returns from said associated third base track of said selected third resulting track;

calculating a coplanarity residual for each of said three returns from said selected third resulting track and three returns from said associated third base track of said selected third resulting track;

calculating an estimate of a three dimensional position vector for each of said three returns from said selected third resulting track and three returns from said associated third base track of said selected third resulting track;

calculating an estimate of velocity of said selected third resulting track and said associated third base track of said selected third resulting track;

using said estimate of said three dimensional position vector for each of said three returns from said selected third resulting track and three returns from said associated third base track of said selected third resulting track and said estimate of velocity of said selected third resulting track and said associated third base track of said selected third resulting track, to calculate a goodness-of-fit between said selected third resulting track and said associated third base track of said selected third resulting track.

5. A tracking system, comprised of plurality of satellite tracking stations orbiting above the surface of the earth, operatively connected to a data processing system, said system comprised of:

means for receiving a first plurality of returns from said plurality of satellite tracking stations and using said first plurality of returns to create a plurality of initial base tracks, each return of said first plurality of returns having an associated time;

means for receiving a second plurality of returns from said plurality of satellite tracking stations and using said second plurality of returns to create a first plurality of resulting tracks, each return of said second plurality of returns having an associated time;

means for creating a set of first pairs, each of said first pairs comprised of a first resulting track selected from said first plurality of resulting tracks and an associated first base track selected from said plurality of base tracks, where said first resulting track and said associated first base track have at least one common return;

means for correlating each of said first resulting tracks with said associated first base track;

means for removing said correlated first resulting tracks from said first plurality of resulting tracks and for creating a second plurality of resulting tracks;

means for creating a set of second pairs, each of said second pairs comprised of a second resulting track selected from said second plurality of resulting tracks and an associated second base track selected from said plurality of base tracks, where said second resulting track and said associated second base track have at least one satellite in common;

means for calculating, for each second pair, an associated time gap where said gap measures the maximum length of time between the time associated with a return from said second resulting track and said time associated with a return from said second base track;

means for removing from said set of second pair each second pairs having an associated time gap greater than a first specified value, creating a remaining set of second pairs;

means for calculating a goodness-of-fit score for each pair in said remaining set of second pairs;

means for removing from said second pairs each second pair having a goodness-of-fit score greater than a second specified value;

means for correlating each of said second resulting tracks remaining in said set of second pairs with said associated second base track;

means for removing said correlated second resulting tracks from said second plurality of resulting tracks creating a third plurality of resulting tracks;

means for creating a set of third pairs, each of said third pairs comprised of a third resulting track selected from said third plurality of resulting tracks and an associated third base track selected from said plurality of base tracks, where said third resulting track and said associated third base track have no satellite in common;

means for calculating a goodness-of-fit score for each pair in said set of third pairs;

means for removing from said set of third pairs each third pair having a goodness-of-fit score greater than a third specified value;

means for correlating each of said third resulting tracks remaining in said set of third pairs with said associated third base track;

means for removing said correlated third resulting tracks from said third plurality of resulting tracks creating a fourth plurality of resulting tracks;

means for creating a set of fourth pairs, each of said fourth pairs comprised of a fourth resulting track and a fourth base track, said fourth pairs created by pairing each of said fourth plurality of resulting tracks with each of said plurality of base tracks;

means for using profile dependent piece correlation to correlate said fourth resulting track with said fourth base track and calculating a goodness-of-fit score for each of said fourth pairs;

means for including said fourth resulting in said plurality of base tracks, if said goodness-of-fit score for a fourth pair is greater than a fourth specified value;

display means for displaying updated base tracks, said updated base tracks comprised of said plurality of base tracks as correlated with said first resulting tracks, said second resulting tracks, said third resulting tracks and said fourth resulting tracks.

6. A system as in claim 5 wherein said first set of pairs is further comprised of a three-return set of pairs and a two-return set of pairs, wherein:

said first track of said three return set of pairs and said second track of said three return set of pairs have at least three common returns and at least four scans in common; and said first track of said two-return set of pairs and said second track of said two-return set of pairs have two common returns and three scans in common.

7. A system as in claim 5 which further includes:

means for removing said returns associated with said correlated first resulting tracks with said returns associated from said each of said resulting tracks in said first plurality of resulting tracks;

means for removing said returns associated with said correlated second resulting tracks with said returns associated from said each of said resulting tracks in said second plurality of resulting tracks; and means for removing said returns associated with said correlated third resulting tracks with said returns associated from each of said resulting tracks in said third plurality of resulting tracks.

8. A system as in claim 5 wherein said means for calculating a goodness-of-fit score for each pair in said set of third pairs further includes:

means for selecting a third resulting track;

means for selecting a return satellite tracking station from said plurality of satellite tracking stations for said selected third resulting track;

means for selecting a base satellite tracking station from said plurality of satellite tracking stations for said associated third base track of said selected third resulting track;

means for selecting three returns from said selected third resulting track and three returns from said associated third base track of said selected third resulting track;

means for calculating a coplanarity residual for each of said three returns from said selected third resulting track and three returns from said associated third base track of said selected third resulting track;

means for calculating an estimate of a three dimensional position vector for each of said three returns from said selected third resulting track and three returns from said associated third base track of said selected third resulting track;

means for calculating an estimate of velocity of said selected third resulting track and said associated third base track of said selected third resulting track; and means for using said estimate of said three dimensional position vector for each of said three returns from said selected third resulting track and three returns from said associated third base track of said selected third resulting track and said estimate of velocity of said selected third resulting track and said associated third base track of said selected third resulting track, to calculate a goodness-of-fit between said selected third resulting track and said associated third base track of said selected third resulting track.

* * * * *